United States Patent [19]

Bowman et al.

[11] Patent Number: 4,486,567

[45] Date of Patent: Dec. 4, 1984

[54] METHOD OF POLYMERIZING HYDROXYL ENDBLOCKED POLYDIORGANOSILOXANE USING QUATERNARY AMMONIUM CARBOXYLATE-CARBOXYLIC ACID CATALYST

[75] Inventors: Sheryl A. Bowman, Midland; James R. Falender, Sanford; Jonathan Lipowitz; John C. Saam, both of Midland, all of Mich.

[73] Assignee: Dow Corning Corporation, Midland, Mich.

[21] Appl. No.: 474,917

[22] Filed: Mar. 14, 1983

[51] Int. Cl.$^3$ ............................................. C08L 83/04
[52] U.S. Cl. .................................... 524/863; 524/493; 524/588; 524/847; 528/12; 528/21; 528/24; 528/26; 528/33
[58] Field of Search .................. 528/12, 21, 24, 26, 528/33; 524/863, 493, 588, 847

[56] References Cited

U.S. PATENT DOCUMENTS

| | | | |
|---|---|---|---|
| 2,460,805 | 2/1949 | Britton et al. | 528/12 |
| 2,906,734 | 9/1959 | Clark | 260/46.5 |
| 2,986,549 | 5/1961 | McLoughlin et al. | 528/12 |
| 3,024,210 | 3/1962 | Weyer | 528/21 |
| 3,160,601 | 12/1964 | Hyde | 260/46.5 |
| 3,208,916 | 9/1965 | Kookootsedes | 528/21 |
| 3,294,717 | 12/1966 | Krantz | 528/21 |
| 3,812,081 | 5/1974 | Dennis et al. | 528/21 |
| 3,997,496 | 12/1976 | Razzano | 260/46.5 R |
| 4,242,250 | 12/1980 | Gagnon et al. | 528/21 |
| 4,431,771 | 2/1984 | Falender et al. | 524/863 |

Primary Examiner—Melvyn I. Marquis
Attorney, Agent, or Firm—Edward C. Elliott

[57] ABSTRACT

Hydroxyl-endblocked polydiorganosiloxane oligomer is polymerized through the use of a catalyst mixture of quaternary ammonium carboxylate and carboxylic acid. The method heats the mixture of oligomer and catalyst to a temperature in the range of from 90° C. to 150° C., removing water from the mixture, until the desired degree of condensation is achieved. When cooled, the product is a stable polydiorganosiloxane of increased molecular weight. The catalyst can be inactivated by heating and removing volatile byproducts. One embodiment of the method adds an acidic or neutral reinforcing filler to the mixture before polymerization to yield a storage stable silicone polymer-filler mixture which is useful in a manner similar to conventionally produced silicone polymer-filler mixtures.

25 Claims, No Drawings

METHOD OF POLYMERIZING HYDROXYL ENDBLOCKED POLYDIORGANOSILOXANE USING QUATERNARY AMMONIUM CARBOXYLATE-CARBOXYLIC ACID CATALYST

BACKGROUND OF THE INVENTION

1. Field of the Invention

This invention relates to the polymerization of hydroxyl-endblocked polydiorganosiloxane oligomer using quaternary ammonium carboxylate and carboxylic acid as catalyst, also the polymerization in the presence of reinforcing filler.

2. Description of the Prior Art

Silicone polymers of both high and low molecular weights have been combined with various types of filler to make thickened compounds and greases, as well as reinforced polymer mixtures used to produce silicone elastomers. The method used commercially has produced polymer of the molecular weight desired, then combined it with the appropriate thickening or reinforcing filler material.

In U.S. Pat. No. 2,906,734, issued Sept. 29, 1959, Clark discloses the use of quaternary ammonium salts of the formula $RR_3'NOR''$ and benzoic or monocarboxylic acid as a catalyst for curing a polysiloxane resin. The polysiloxane resin is required to have at least 0.8 percent by weight silicon-bonded hydroxyl radical based on the weight of the siloxane.

In U.S. Pat. No. 3,160,601, issued Dec. 8, 1964, Hyde discloses the use of amine salts as catalysts for the condensation of silicon-bonded hydroxyl groups. Hyde uses a salt of a phosphoric acid or a salt of a carboxylic acid and ammonia or amines as catalysts. The salt must be compatible in the system. The salt must have at least 6 carbon atoms.

In U.S. Pat. No. 3,997,496, issued Dec. 14, 1976, Razzano discloses a process of reacting a mixture of silanol endstopped perfluoroalkyl-substituted organopolysiloxane of 3 to 5 units alone or with a second silanol endstopped diorganopolysiloxane having 3 to 5 units in the presence of a non-bond-rearranging catalyst and removing the water of condensation. Suitable catalysts include amines and amine salts such as benzyltrimethylammonium acetate. The resulting polymer, having a viscosity from 2000 cps to 200,000,000 cps, can be mixed with reinforcing filler.

SUMMARY OF THE INVENTION

It has now been found that certain quaternary ammonium carboxylate catalysts in combination with carboxylic acid can be used to polymerize hydroxyl-endblocked polydiorganosiloxanes. It has now been shown that such a procedure can be used in the presence of acidic or neutral reinforcing filler.

A method has been developed to polymerize hydroxyl-endblocked polydiorganosiloxane oligomer, either alone or in the presence of filler. The filler is dispersed in the oligomer while it is a low viscosity, using little energy, then the oligomer is polymerized to a higher viscosity. The method comprises mixing a hydroxyl-endblocked polydiorganosiloxane fluid with quaternary ammonium carboxylate and carboxylic acid and heating to a temperature in the range of from 90° C. to 150° C. while removing water from the mixture until the desired degree of condensation is reached, then cooling to yield a polydiorganosiloxane having a higher molecular weight than the starting material. The catalyst can be inactivated by increasing the temperature of the mixture after the desired degree of condensation is reached. A triorganosiloxy endblocked polydiorganosiloxane (b) can be mixed with the oligomer to aid in controlling the molecular weight of the final polydiorganosiloxane. The method of the invention also comprises the procedure described above in which an acidic or neutral reinforcing filler is mixed with the hydroxyl-endblocked polydiorganosiloxane (a) before the oligomer is condensed to a higher molecular weight.

The method of this invention can yield a silicone polymer-filler mixture suitable for use as an electrical insulation compound, grease, or as a reinforced polymer mixture useful in producing silicone elastomers.

The method of this invention can yield a storage stable silicone polymer-filler mixture, using less energy than previous methods, which does not require the addition of anti-crepe hardening agents.

The method of this invention uses a polymerization catalyst which can be inactivated at the end of the polymerization by heating, making possible the manufacture of nearly transparent elastomers.

DESCRIPTION OF THE INVENTION

This invention relates to a method of polymerizing polydiorganosiloxane oligomer comprising (A) removing water from a mixture of (i) 100 parts by weight of polydiorganosiloxane (a) of the formula

$$HO(R_2SiO)_xH$$

where each R is selected from the group consisting of methyl, ethyl, propyl, phenyl, vinyl, allyl, and 3,3,3,-trifluoropropyl radicals, x being an average of from 3 to 50, (ii) from 0.05 to 5.0 parts by weight of quaternary ammonium carboxylate of the formula

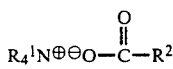
$$R_4^1N^{\oplus\ominus}O-\overset{\overset{O}{\|}}{C}-R^2$$

where each $R^1$ is selected from the group consisting of monovalent aliphatic radicals having from 1 to 20 carbon atoms and aralkyl radicals and each $R^2$ is selected from the group consisting of monovalent aliphatic hydrocarbon radicals of 5 or less carbon atoms, phenyl radical, and benzyl radical, at least one $R^1$ having 4 or greater carbon atoms, and (iii) at least 0.05 part by weight of carboxylic acid of the formula

$$R^2COOH$$

where $R^2$ is as defined above, at a temperature in the range of from 90° C. to 150° C. until the predetermined increase in molecular weight of (a) is achieved by condensation polymerization, then (B) cooling to ambient temperature to produce a polydiorganosiloxane having a higher molecular weight than (i).

During the method of this invention, the catalyst can be inactivated by increasing the temperature of the mixture, after the predetermined increase in molecular weight is achieved, to a temperature sufficient to cause the condensation polymerization to cease, removing volatile byproducts during the process.

The method of this invention further includes an embodiment adding from 2 to 70 parts by weight of reinforcing filler, said filler being acidic or neutral, added to the mixture of step (A) above. The method can be further modified by including a polydiorganosiloxane (b) of the formula $R_3{}^3SiO(R_2SiO)_zH$ where each R is as defined above, $R^3$ is selected from the group consisting of monovalent hydrocarbon radicals of 5 or less carbon atoms, phenyl radical, or benzyl radical, and z is an average value of from 0 to 50 inclusive to aid in the control of the molecular weight of the final polydiorganosiloxane. The mixture of (A) can be further mixed with a solvent which is non-reactive with the ingredients.

The method of this invention produces a polydiorganosilxane having a higher molecular weight than (i). The polydiorganosiloxane produced can be a homopolymer or copolymer, being endblocked with hydroxyl radical, carboxy radical, aliphatic hydrocarbon radicals of 5 or less carbon atoms, phenyl radical, or benzyl radical.

The method of this invention can produce a dispersion of a high surface area, reinforcing filler within a linear polydiorganosiloxane. The method of this invention can produce, directly and economically, a product suitable for greases, for use in sealants, and as a base mixture for use in producing silicone elastomers. These various types of products are produced by varying the type and amount of reinforcing filler used, as well as the formulation and molecular weight of the polymer formed.

The method of this invention uses a hydroxyl-endblocked linear polydiorganosiloxane oligomer of low viscosity as starting ingredient. A reinforcing filler can be mixed with the oligomer before polymerization takes place. The amount of energy necessary to disperse the reinforcing filler in the oligomer is significantly lower than that necessary to disperse a reinforcing filler in a high molecular weight polymer, particularly polymers of the gum type used in making the conventional heat-cured silicone elastomers.

Previously, the interaction between filler and polymer known as crepe hardening could be prevented by using reinforcing fillers which had been pretreated, or those treated in situ. The product produced by the method of this invention does not require either pretreated filler or anti-crepe hardening agents in order to produce a storage stable mixture. The method of this invention is more economical because the pretreated filler or a treating agent are no longer necessary.

It has also been found that the method of this invention produces a polymer-filler mixture which has an unpredicted low volatile content. There are no cyclic materials formed during the polymerization.

The polydiorganosiloxane (a) used in this invention is of the formula $$HO(R_2SiO)_xH$$

wherein each R is selected from the group consisting of methyl, ethyl, propyl, phenyl, vinyl, allyl, and 3,3,3-trifluoropropyl radicals. The polydiorganosiloxane (a) is an essentially linear polymer having a degree of polymerization of from 3 to 50. Higher viscosity polymers would be functional in this invention, but because one of the advantages of the method of this invention is the ease of dispersing reinforcing filler in a low viscosity fluid, there is no reason to use a higher viscosity polymer than those shown. Each R may be the same or different and the polydiorganosiloxane (a) can be a homopolymer or a copolymer. The polydiorganosiloxane (a) can be a single material or it can be a mixture of different hydroxyl-endblocked polydiorganosiloxanes.

The polydiorganosiloxanes (a) are commercial materials, commonly manufactured by the addition of the appropriate diorganodichlorosilane to a water/solvent mixture to yield a mixture of low molecular weight hydroxyl-endblocked polydiorganosiloxane and diorganocyclosiloxane in solvent. Purification and distillation of the mixture yields the polydiorganosiloxane (a).

Some of the cure systems used to produce curable compositions from the silicone polymer-filler mixture require the silicone polymer to contain unsaturated alkyl radical such as vinyl and allyl radicals. Vinyl radicals have been introduced into the polymer by copolymerizing the required amount of a short chain hydroxyl-endblocked polymethylvinylsiloxane with a polydimethylsiloxane, mixing well, adding filler, and polymerizing.

The mixture to be polymerized can also contain a triorganosiloxy endblocked material. When the final polydiorganosiloxane polymer is to have a relatively low viscosity, it is desirable to include $R_3{}^3SiO_{0.5}$ units as endblockers to aid in obtaining a polymer of the desired molecular weight.

When it is desirable to control the molecular weight of the final polydiorganosiloxane or to obtain a polydiorganosiloxane with other than hydroxyl-endblocking, a polydiorganosiloxane (b) of the formula $$R_3{}^3SiO(R_2SiO)_zH$$

is added in the required amount. One of the easiest means of adding the partially endblocked polydiorganosiloxane is to manufacture it in situ by adding a reactive silane to the hydroxyl-endblocked polydiorganosiloxane at the beginning of the method. The reactive silane is of the formula $$(R_3{}^3Si)_nX$$

where n is the valence of the reactive group X. X can be any of the well known groups which react with hydroxyl groups on silicon such as $-Cl$, $-NH_2$, $-NR_2{}^2$, $-N(R^2)COR^2$, $-NHR^2$, $=NH$, and $=NR^2$. $R^2$ is selected from the group consisting of monovalent hydrocarbon radicals of 5 or less carbon atoms, phenyl radical, and benzyl radical. When the reactive silane is added to the hydroxyl-endblocked polydiorganosiloxane, the materials react spontaneously, resulting in the replacement of the hydroxyl radical with an endblocking group. The byproduct hydrogen chloride, ammonia or amide is easily removed from the reaction mixture if desired. Because the amount of silane added is generally small, the byproduct ammonia or amides can be either removed during the following processing, or in some uses it can remain. One preferred method uses the addition of stoichiometric amounts of two reactive silanes such as $R_3{}^3SiCl$ and $R_3{}^3SiNH_2$ to a hydroxyl-endblocked polydiorganosiloxane. The leaving groups then react with each other and the salt is easily filtered from the reaction mixture.

Polydiorganosiloxane (b) can be produced using the reaction between diorganocyclosiloxane and organo lithium compounds described in U.S. Pat. No. 3,337,497, issued Aug. 22, 1967, to Bostick, which is hereby incorporated by reference to show the preparation of polydiorganosiloxane (b) having a hydroxyl radical at one end and a $R_3{}^3SiO_{0.5}$ radical at the other.

Other methods of producing (b) are disclosed in U.S. Pat. No. 3,274,145, issued Sept. 20, 1966, to Dupree, which is hereby incorporated by reference to show preparation of polydiorganosiloxane (b).

The polydiorganosiloxane produced by the method of this invention is endblocked with hydroxyl radical, or possibly acyloxy radical from the catalyst, or a mixture, depending upon the exact conditions used, unless an endblocker material is added during step (A). By choice of the $R_3{}^3SiO_{0.5}$ radicals in the endblocker, the final polydiorganosiloxane may be endblocked with a hydrocarbon radical such as methyl to give an unreactive polydiorganosiloxane, or with vinyl or allyl, for instance, to give polydiorganosiloxane that can be further reacted. A vinyl-endblocked polydiorganosiloxane is desirable in some of the methods used to produce a curable composition.

The method of this invention uses from 0.05 to 5.0 parts by weight, based upon 100 parts by weight of polydiorganosiloxane (a) of quaternary ammonium carboxylate (ii), as defined above as part of the catalyst used, to catalyze the condensation polymerization of the polydiorganosiloxane (a). The quaternary ammonium carboxylate is preferably soluble in the polydiorganosiloxane (a), at least one of the organic radicals $R^1$ has 4 or greater carbon atoms to impart solubility to the quaternary ammonium carboxylate. Examples of $R^1$ include methyl, butyl, lauryl, gamma hydroxypropyl, B-phenylethyl, and hexenylethyl radicals. Examples of quaternary ammonium carboxylates are tetra-n-butylammonium acetate, lauryltrimethylammonium acetate, dilauryldimethylammonium acetate, and lauryltrimethylammonium formate. The quaternary ammonium carboxylate is preferably used in conjunction with the corresponding carboxylic acid. The rate of polymerization is dependent upon the amount of (ii) present, as well as the amount of filler surface. The amount of (ii) can vary from 0.05 to 5 parts by weight based upon 100 parts by weight of (a) with the preferred amount being from 0.1 to 2.0 parts by weight. A preferred quaternary ammonium carboxylate is lauryltrimethylammonium acetate.

The preferred lauryltrimethylammonium acetate can be prepared by first making a slurry of 18 parts by weight of anhydrous sodium acetate, 37 parts by weight of glacial acetic acid, and 45 parts of ethyl alcohol. To this is added 100 parts of lauryltrimethylammonium chloride in the form of a 50% by weight dispersion in a mixture of 35 percent by weight isopropyl alcohol and 15 percent by weight water. This mixture is stirred to allow reaction, then stripped at 60° C. and a reduced pressure of 13 kPa. The resulting product is filtered to yield a clear amber oil which is composed of about 40% lauryltrimethylammonium acetate, 16% lauryltrimethylammonium chloride, 33% acetic acid, and 11% a mixture of ethanol and isopropanol.

Carboxylic acid (iii) is used in an amount of at least 0.05 part by weight in conjunction with the quaternary ammonium carboxylate as the polymerization catalyst. The amount of carboxylic acid used is not critical as long as it is present during the polymerization, an amount of from 0.5 to 10 parts by weight, based upon 100 parts by weight of (a), being preferred. If the filler used is of a low amount, as below 10 parts for instance, the filler surface area is not too high, as above 450 m²/g for instance, and it is not desired to polymerize to a high viscosity polymer, the amount of carboxylic acid can be minimal. Usually it is necessary to add additional carboxylic acid during the polymerization to keep the quaternary ammonium carboxylate active. Because the polymerization is carried out at temperatures of from 90° C. to 150° C., the carboxylic acid can be lost from the system and must be periodically replaced to keep the catalyst active. The preferred carboxylic acid is glacial acetic acid because it is readily available and its boiling point of 118° C. makes it easy to remove from the mixture at the end of the polymerization. Because the method of this invention removes water in step (A), it is preferable to use ingredients which contain a minimum amount of water so the glacial form of acetic acid is preferred.

The initial step in the method of this invention includes the mixing of the polydiorganosiloxane (a) with the quaternary ammonium carboxylate (ii) and the carboxylic acid (iii). Embodiments of the invention also can include a diluent which is non-reactive with the ingredients, a triorganosiloxy endblocked polydiorganosiloxane (b) to provide $R_3{}^3SiO$-endblocking when desired, and a reinforcing filler, said filler being acidic or neutral.

The mixing device used in practicing this invention depends upon the product to be made. The mixing device should be capable of heating to at least 90° C., cooling to room temperature, and removing gases from the space over the mixture. The removal of the gases in the space over the mixture can be by means of an inert gas sweep, by drawing a vacuum, or a combination of both. An example of a suitable mixing device is the common dough type mixer used to mix gum type polymers and reinforcing fillers. This type of mixer could be used to produce a product which was of gum-type viscosity as well as products of lower viscosity. If the product to be produced is of a lower viscosity, such as is used in the common sealants, a light duty mixer is sufficient since the product will not require a heavy duty mixer capable of mixing gum-type material. With either type of mixing equipment, the total energy used is reduced because the filler is mixed into the low viscosity oligomer rather than the higher viscosity polymer obtained after polymerization.

The step (A) of this invention removes water from the mixture of oligomer and catalyst, heating the mixture to a temperature of from 90° C. to 150° C. The order of mixing and heating is not critical. Preferably the oligomer is first heated to remove any water present, preferably at a temperature of from 100° C. to 135° C., then the quaternary ammonium carboxylate (ii) and carboxylic acid (iii) are added. In an embodiment in which diluent is present in the mixture, preferably the diluent and oligomer would be mixed, heated, then (ii) and (iii) added. In an embodiment in which filler is present in the mixture, the filler and oligomer could be mixed, then heated, or the oligomer could be heated and then the filler mixed in; then (ii) and (iii) would be added.

The mixture is catalyzed by adding quaternary ammonium carboxylate (ii) and carboxylic acid (iii). The quaternary ammonium carboxylate and carboxylic acid can be added to (a) before heating, during heating, or after heating the oligomer. Preferably they are added after heating the oligomer. When the quaternary ammonium carboxylate is acetate, it is preferable to heat to a temperature of from 110° C. to 130° C. The catalyzed mixture is polymerized by continuing to maintain the elevated temperature and removing water from the system by application of a dry gas purge, a vacuum, both, or any other means that removes water, such as azeotroping out the water when solvent is used in the method. During the water removal, a portion of the carboxylic acid may also be lost. If the polymerization is to continue, the lost carboxylic acid must be periodically renewed, in order to keep the catalyst active.

After the polydiorganosiloxane (a) has been polymerized to the desired degree, the mixture is cooled to ambient temperature to produce a polydiorganosiloxane having a higher molecular weight than the starting polydiorganosiloxane (a). This higher molecular weight polydiorganosiloxane can be further processed as taught in this invention or used as is. For instance, in the embodiment in which the final polydiorganosiloxane is a polydimethylsiloxane having trimethylsiloxy endblocking the polymer could be used to produce known products such as polishes and release agents from such a polymer. The final polydiorganosiloxanes containing hydroxyl endblocking could be used in producing sealants, for example those having a moisture curable acetoxy cure system.

The method of this invention can also include a means for inactivating the polymerization. After the polydiorganosiloxane (a) has been polymerized to the desired degree, the catalyst can be inactivated by heating to a temperature sufficient to cause the condensation polymerization to cease. This heating step is carried out to remove the carboxylic acid, to decompose the catalyst, and to remove the byproducts of the catalyst decomposition. Any one of these events will inactivate the catalyst. The temperature required for this step is determined by the quaternary ammonium carboxylate and the carboxylic acid used. The temperature can be experimentally obtained by noting the temperature at which the condensation of (a) in this step no longer takes place, signifying that the catalyst is no longer active. Another means of determining the required temperature would be an experiment using a series of different temperatures for this step then observing the shelf stability or stability upon heat aging of the products produced. The inactivation temperature of the catalyst can also be estimated by running a thermogravametric analysis on the quaternary ammonium carboxylate to determine the temperature at which it decomposes and significant weight loss occurs. When the quaternary ammonium carboxylate is acetate, it is preferable to heat to a temperature of from 150° C. to 200° C. to decompose the quaternary ammonium acetate and remove volatile byproducts.

After the step to inactive the catalyst, the product is then cooled to room temperature, yielding a storage stable silicone polymer. The storage stable silicone polymer produced by this method is particularly useful because it contains no cyclic material. Because the catalyst is inactivated by heating, rather than by neutralizing with a material such as silica or magnesium oxide as is used in some methods, the polymer produced is clear. The polymer produced is a polydiorganosiloxane which can be further processed with fumed silica filler to yield a clear, translucent mixture. Upon further catalysation, molding, and curing, following methods well known in the art, a clear, translucent elastomer can be produced. The polymer can also be combined with the well known reinforcing fillers, extending fillers, pigments, and catalysts used in producing silicone elastomers to yield silicone sealants and elastomers.

Polymerization with Solvent

The method of this invention includes an embodiment in which the polymerization takes place in the presence of a solvent. The solvent is non-reactive with the other ingredients. The solvent can be such as toluene or mineral spirits. Solvents such as these should preferably have a boiling point in the range of from 90° C. to 150° C. at the operating pressure of the polymerization to allow for removal of water from the mixture during the polymerization, if desired. The finished polydiorganosiloxane can then be removed from the solvent by stripping out the solvent; or the mixture can be used as is, for instance as an ingredient in a paper coating or as an ingredient in a paint. Because the method of this invention does not produce cyclic material during the polymerization, it is particularly suitable for polymerization in the presence of solvent. Since the polymerization process does not affect cyclic siloxanes, it is even possible to use cyclic siloxanes or linear $R_3SiO_{\frac{1}{2}}$ endblocked siloxanes as solvents. It is well known in the art that the usual condensation catalysts and cyclic polymerization catalysts, such as potassium hydroxide tend to give equilibrium concentrations of cyclics during polymerization. For polydimethylsiloxane, the equilibrium cyclics constitute about 15 percent by weight of the polymer produced. If the polymerizations is in solution the amount of equilibrium cyclics produced is higher, for instance about 36 percent by weight at a 50 percent by weight concentration and 70 to 80 percent by weight at a 25 percent by weight concentration. The method of this invention allows polymerization in solvent without the production of cyclic materials.

Polymerization in the Presence of Filler

Another embodiment of this invention combines from 2 to 70 parts by weight of reinforcing filler, said filler being acidic or neutral, with the polydiorganosiloxane (a) in step (A) before the oligomer is polymerized.

The filler used in this embodiment of this invention is a material which is finely divided particles of an acidic or neutral nature and is classed as reinforcement for silicone elastomers. For purposes of this invention, an acidic filler is one which gives a pH of less than 7 when a 2 percent by weight slurry is prepared with distilled water. A neutral filler would have a pH of about 7. Examples of acidic fillers include some types of carbon black, fumed silica, precipitated silica, and fumed titanium dioxide. The diatomaceous earths are examples of semi-reinforcing fillers which are neutral. The preferred filler is fumed silica with a surface area of from 150 $m^2/g$ to 400 $m^2/g$. The fumed silicas of this type are readily available. The amount of filler used is determined by the end use of the silicone polymer-filler mixture. Examples include antifoam materials with as little as 2 percent by weight of silica, electrical insulation greases which normally contain from 5 to 20 parts of filler, sealant type materials which may contain from 10 to 30 parts of reinforcing silica, and heat cured silicone elastomers which contain from 20 to 70 parts by weight of reinforcing silica. Preferably, the amount of reinforcing silica is from 10 to 50 parts by weight for use in heat cured silicone elastomers. The choice of filler amounts and the effect it has upon the handling and physical properties of the final products is well known to those skilled in the art. If a fumed silica having a high surface area, for instance 400 $m^2/g$, is used at too high a level, for instance about 40 parts by weight, the molecular weight of the polymer formed tends to be low and there is excessive polymer-filler interaction. Higher amounts of fumed silica having a lower surface area could be used.

This embodiment of this invention yields a silicone polymer-filler mixture which can be produced with a substantial net savings in energy when compared to the customary method of mixing reinforcing filler and anticrepe hardening agent into a high viscosity siloxane fluid or gum. The initial step in this embodiment is the dispersion of the filler into the oligomer. The more uniformly and completely the filler is dispersed, the more uniform will be the final product. The mixing process can be done in a container with a stirrer, by rolling the ingredients together in a jar, or by passing the mixed ingredients through an intensive mixer such as a colloid mill. In any case, the mixture should be in the form of a slurry or paste since the customary mixing devices, such as dough mixers, are designed to operate most efficiently with these forms of mixtures. Because the filler is dispersed into a low viscosity oligomer, it requires much less time and energy to obtain a good dispersion than that required by the customary method.

After the reinforcing filler is properly dispersed in the oligomer, the mixture of oligomer and filler is placed into the mixing device and the steps discussed above are followed to yield a silicone polymer-filler mixture. When the final product to be produced is a silicone polymer-filler mixture suitable for use in producing a high consistency silicone rubber, the means for removing water from the mixture being polymerized must be more efficient than when lower viscosity polymers are being produced. For this reason, a portion of the carboxylic acid may be carried out of the mixer. Additional carboxylic acid is periodically added to replace that which is lost. If a concentration of carboxylic acid is not maintained in the mixture, the polymerization will not proceed. Failure of the viscosity of the mixture being polymerized to rise can be an indication that the mixture does not contain the required concentration of carboxylic acid.

When the silicone polymer-filler mixture has reached the desired viscosity, the catalyst is inactivated by increasing the temperature of the mixture to a point sufficient to cause the condensation polymerization to cease, removing volatile by products during the process. The silicone polymer-filler mixture produced is a storage stable product consisting of a reinforcing filler dispersed in a silicone polymer.

The silicone polymer-filler mixture of the above embodiment of this invention can also contain extending fillers such as commonly used in silicone elastomers. Acidic or neutral extending filler can be added either before or after polymerization. Addition after polymerization would be in the usual manner such as mixing in a dough mixer or on a two-roll mill.

The silicone polymer-filler mixture of this invention can also be combined with the additives normally used with silicone polymer-filler mixtures such as thickeners, pigments, heat stability additives, oil resistance additives, and flame retardant additives.

The silicone polymer-filler mixtures produced by the above embodiment of this invention can be used in producing curable compositions which yield cured silicone elastomer in a manner such as is done with conventional filled polydiorganosiloxanes. A common method is the addition of an organic peroxide vulcanizing agent to the filled polydiorganosiloxane mixture. The organic peroxide vulcanizing agents suitable for use in silicone elastomers are well known. If the silicone polymer-filler mixture does not contain any vinyl radicals, it is vulcanized with organic peroxides that are efficient in causing reactions in non-vinyl containing polydiorganosiloxanes. Such organic peroxides are labeled "non-vinyl specific" and are represented by such organic peroxides as benzoylperoxide and 2,4-dichlorobenzoylperoxide. If the silicone polymer-filler mixture contains vinyl radicals, it can be vulcanized with either "non-vinyl specific" or "vinyl specific" organic peroxides. Representative of the vinyl specific organic peroxides are ditertiary-butyl peroxide and 2,5-bis-(tert-butylperoxy)-2,5-dimethylhexane. The properties of the cured silicone elastomer can be altered by the type and amount of vulcanizing agent used to cure the composition. Typical changes due to such choices are well recognized in the art. The organic peroxide vulcanizing agent can be present in amounts from 0.1 to 5 parts by weight per 100 parts by weight of the silicone polymer-filler mixture, preferably from 0.5 to 2.0 parts by weight.

The embodiments of the method of this invention which give a polymer having hydroxyl groups on the ends can be further mixed with curing agents to yield curable compositions. A number of methods are known for combining hydroxyl containing polydiorganosiloxane in an essentially anhydrous mixture with a curing agent to yield a one part curable composition. These compositions cure to silicone elastomers upon exposure to the atmosphere. Methods are available based upon tri-functional and tetra-functional silanes as crosslinking agents as well as short polymeric crosslinkers. Among the functional groups used are acetoxy radicals, alkoxy radicals, amino radicals, and amino radicals. Common crosslinkers include those represented by the formulas:

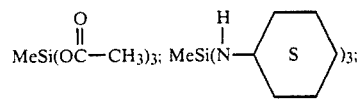

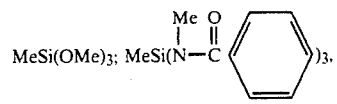

MeSi(O—N=CEtMe)₃, and MeSi(ONEt₂)₃ where Me is the methyl radical and Et is the ethyl radical. Common catalysts for these systems include metal carboxylates, alkyl metal carboxylates, alkyl metal alkoxides, and titanates. Preferred catalysts are stannous octoate, dibutyltindiacetate, dibutyltindilaurate, tetrabutyltitanate, dibutyltindimethoxide, and tetraisopropyltitanate. Methods of producing compositions which cure to silicone elastomers upon exposure to moisture based upon hydroxyl-containing polydiorganosiloxanes in which the products of this invention can be substituted include those disclosed in U.S. Pat. No. 3,077,465, issued Feb. 12, 1963 to Bruner; U.S. Pat. No. 3,189,576, issued June 15, 1965 to Sweet; U.S. Pat. No. 3,294,739, issued Dec. 27, 1966 to Weyenberg; and U.S. Pat. No. 3,334,067, issued Aug. 2, 1967 to Weyenberg, all of which are incorporated by reference to teach methods of mixing curing agents into hydroxyl containing polydiorganosiloxanes in which the products of this invention can be substituted to yield compositions stable in the absence of moisture which cure to silicone elastomers upon exposure to moisture.

Methods are well known for combining hydroxyl-containing polydiorganosiloxanes with curing agents that produce two part products which cure at room temperature upon mixing the ingredients. Examples of such methods in which the products of this invention can be substituted are found in U.S. Pat. No. 3,061,575, issued Oct. 3, 1962 to Russell; U.S. Pat. No. 3,184,427, issued May 18, 1965 to Russell et al.; U.S. Pat. No. 3,509,081, issued Apr. 28, 1970 to Gignac, Jr; and U.S. Pat. No. 3,989,668, issued Nov. 2, 1976 to Lee et al., all of which are incorporated by reference to teach methods of mixing curing agents into hydroxyl containing polydiorganosiloxanes in which the products of this invention can be substituted to yield compositions which cure to silicone elastomers.

When the polydiorganosiloxane contains two or more unsaturated monovalent aliphatic radicals per polymer molecule, such as vinyl and allyl radicals, it can be combined with a curing agent comprising an organohydrogensiloxane having an average of greater than two silicon-bonded hydrogen atoms per molecule and a platinum-containing catalyst in an amount sufficient to provide at least one part by weight platinum per million parts by weight polydiorganosiloxane. The organohydrogensiloxane is present in sufficient quantity to provide at least one silicone-bonded hydrogen atom per unsaturated monovalent aliphatic radical in the polydiorganosiloxane. The polydiorganosiloxane preferably contains from 0.01 to 2.0 mole percent unsaturated monovalent aliphatic radical. Examples of such curing methods are found in U.S. Pat. No. 3,697,473, issued Oct. 10, 1973, to Polmanteer et al.; U.S. Pat. No. 3,445,420, issued May 20, 1969, to Kookootsedes et al.; and U.S. Pat. No. 4,032,502, issued June 28, 1977 to Lee et al., all of which are incorporated by reference to teach methods of mixing curing agents into diorganosiloxanes containing unsaturated monovalent aliphatic radicals in which the products of this invention containing unsaturated monovalent aliphatic radicals can be substituted for the diorganosiloxanes to produce curable compositions.

The following examples are included for illustrative purposes only and should not be construed as limiting the invention which is properly set forth in the appended claims. All parts are parts by weight.

The molecular weight of the polydimethylsiloxanes was determined by gel permeation chromatography techniques designed for this type of material in these molecular weight ranges. The solvent was toluene, the columns were Styragel and polydimethylsiloxane standards were used to calibrate the equipment. The molecular weight was determined from the resulting curves obtained using a refractive index detector. The peak molecular weight was taken as the molecular weight which corresponded to the maximum molecular weight shown by the curves.

EXAMPLE 1

A hydroxyl-endblocked polydimethylsiloxane having a degree of polymerization of about 35 and a viscosity of about 0.08 Pa·s at 25° C. in the amount of 312 g was heated to 115° C. in a doughmixer. Then 1.3 g of dilauryldimethylammonium acetate and 1.8 g of glacial acetic acid were added with mixing. After 1.5 hours, the mixture had a peak molecular weight as determined by gel permeation chromotography of 150,000. Further condensation to a sticky gum of 250,000 peak molecular weight occurred in 5 hours. The mixture stabilized at this point in the laboratory, which was at 25° C. and 50 percent relative humidity, a condition which produces a water vapor pressure of 1.6 kPa.

The above procedure was repeated, but the mixer was purged with dry air during the mixing and heating. After 50 minutes, a sticky gum having a peak molecular weight of 163,000 was obtained. In 2.5 hours, a dry gum of peak molecular weight of 794,000 and a Williams plasticity of 240 was obtained. After 18 hours, a very dry gum of peak molecular weight of 1,530,000 was obtained.

EXAMPLE 2

A mixture of 1250 g of the hydroxyl-endblocked polydimethylsiloxane of Example 1 was heated to 120° C. with stirring in a dough mixer and 16 g of hexamethyl disilazane was mixed in to endblock the polymer. Then 6.2 g of lauryltrimethylammonium acetate and 12.2 g of glacial acetic acid were mixed in. A dry air purge was applied to the mixture to remove moisture from the condensation reaction. After 3 hours, the reaction mixture was vacuum stripped at a temperature of from 194° C. to 200° C., then cooled and filtered. The resulting clear fluid polydimethylsiloxane had a peak molecular weight of 18,800.

EXAMPLE 3

A mixture of 250 g of the hydroxyl-endblocked polydimethylsiloxane of Example 1 and 9.6 g of a 50 percent by weight solution of diphenylmethylsilanol in toluene to endblock the polymer were heated to 115° C. in a dough mixer. Then 1 g of lauryltrimethylammonium acetate and 1 g of glacial acetic acid were mixed in. Condensation was allowed to proceed for 3 hours in the open mixer, the water formed boiling out of the hot mixture. The fluid produced was then vacuum stripped to yield a diphenylmethylsiloxy endblocked polydimethylsiloxane with a viscosity of 5.1 Pa·s at 25° C. and a peak molecular weight of 46,500.

EXAMPLE 4

A dough mixer was loaded with 454 g of the hydroxyl-endblocked polydimethylsiloxane of Example 1, then heated to 110° C. with mixing. Then 2.3 g of lauryltrimethylammonium acetate and 2.3 g of glacial acetic acid were added. A dry air sparge was passed through the mixture. After 1 hour and 22 minutes, the viscosity was 9.7 Pa·s. After 1 hour and 32 minutes, the viscosity was 24.0 Pa·s. Then steam at one atmosphere was introduced into the mixer which was maintained at 100°–105° C. The viscosity remained constant over a 48-hour period under these conditions showing that water at one atmosphere is in equilibrium with polymer of this viscosity. The polymer would be predominently hydroxyl endblocked. A sample was removed and heated to 170° C. for one hour to deactivate the catalyst. This sample had a viscosity of 27.8 Pa·s.

EXAMPLE 5

A mixture of 536 g of the hydroxyl-endblocked polydimethylsiloxane of Example 1 and 177 g of a hydroxyl-endblocked polymethylvinylsiloxane with an average degree of polymerization of 12 was heated in a mixer to 110° C. with stirring. Then 4.6 g of 1,2-divinyltetramethyldisilazane was added and mixed in. Next, 2.8 g of lauryltrimethylammonium acetate and 4 g of glacial acetic acid were added and the mixture sparged with dry nitrogen. The mixture reached a constant viscosity in about 4 hours. The mixture was vacuum stripped at 180°–195° C., giving a clear, colorless fluid copolymer having a viscosity of 4.96 Pa·s and a peak molecular weight of 49,600.

EXAMPLE 6

A mixture of 210 g of the hydroxyl-endblocked polydimethylsiloxane of Example 1 and 490 g of toluene was heated to reflux in a reactor containing a stirrer, condenser, and Dean-Stark water trap. Then 0.6 g of lauryltrimethylammonium acetate and 0.4 g of glacial acetic acid were added. After 3 hours, the solution was quite viscous and 1.5 ml water had been collected in the water trap by azeotropic distilation with the toluene and separation by the water trap. The polymer recovered from the solution had a peak molecular weight of 145,000.

A similar procedure using mineral spirits as the solvent and polymerization at a temperature of 110° C. for 4.5 hours yielded a polymer having a peak molecular weight of 351,000.

EXAMPLE 7

A mixture of 300 g of the hydroxyl-endblocked polydimethylsiloxane of Example 1 and 800 g of mineral spirits was mixed in a reactor containing stirrer, condenser, and recirculating trap at the bottom of the condenser that allowed the condensed vapors to flow back into the reactor. This trap was packed with anhydrous calcium sulfate dessicant and Linde brand molecular sieves to remove any water. The mixture was heated to 115° C. Then 1.5 g of lauryltrimethylammonium acetate and 1.5 g of glacial acetic acid were added. Dry nitrogen was sparged through the mixture in the reactor. The condensed volatiles from the condenser flowed into the water trap and back into the reactor, the return line being adjusted so that the trap remained almost full of liquid. After 4.5 hours, the solution was heated to 168°–170° C. to deactivate the catalyst and 100 g of solvent was distilled out. The resulting clear, colorless solution had a solids content of about 31 percent and a viscosity of 15.5 Pa·s The polydimethylsiloxane recovered from the solution had a peak molecular weight of 686,000.

A similar procedure using 608 g of a mixture of hydroxylendblocked polydiorganosiloxane in polydimethylcyclosiloxane as a solvent and 0.81 g of hexamethyldisilazane as an endblocker yielded a polymer, after vacuum stripping at 160°–200° C., with a viscosity of 10.7 Pa·s and a peak molecular weight of 71,000.

EXAMPLE 8

A clean dough mixer was steam heated so that the contents would reach a temperature of 120° C. Then 230 g of a hydroxyl-endblocked polydimethylsiloxane having a degree of polymerization of about 35 (viscosity of about 0.07 Pa·s and weight average molecular weight of about 2600) was placed in the mixer and 70 g of fumed silica having a surface area of about 400 m²/g was mixed in. Then 2.3 g of a catalyst consisting of about 40 percent by weight lauryltrimethylammonium acetate in a mixture of acetic acid, ethanol and isopropanol was added along with 2.3 g of glacial acetic acid. After 30 minutes of stirring, a wet slurry had formed. A purge of dry nitrogen was then started through the mixer to remove water and any volatiles. An additional 2.3 g of glacial acetic acid was added 0.5, 1.5, 2.5, and 3.5 hours after the catalyst addition. After 4.5 hours, a high consistency base mixture had formed. The temperature of the base mixture was raised to 150° C. for 1 hour under a pressure of 7.33 kPa to decompose the catalyst and remove byproducts. The base mixture was a paste-type material.

A sample of the base mixture was mixed for 24 hours in a mixture of ammonium hydroxide, water, and toluene to uncouple the filler and polymer. Then the resulting mixture was centrifuged to separate the sample. The polymer-toluene layer was removed, the toluene evaporated, and the weight average molecular weight of the polymer was measured by use of gel permeation chromotography. The weight average molecular weight was 230,000.

A 40 g portion of the base mixture was formed into a thin sheet and heated for 3 hours at 200° C. in an air-circulating oven. The portion was then mixed on a 2-roll mill with 1.2 g of a 50 percent active mixture of 2,4-dichlorobenzoyl peroxide in inert paste and press molded for 5 minutes at 116° C. into a test sheet. The sheet was postcured for 4 hour at 200° C., then cut into test pieces. Testing was in accordance with ASTM-D2240 for durometer, ASTM-D412 for tensile strength and elongation, and ASTM-D2632 for Bashore Resiliency. The measured values were: durometer, 47 Shore A ; tensile strength, 5.00 MPa (megaPascal); elongation, 230 percent; Bashore resiliency 47.

EXAMPLE 9

A series of compositions were prepared using different levels of fumed silica filler of different types.

Composition Number 1 was prepared using the procedure of Example 8, except that the filler was used at a level of 40 parts filler per 100 parts polydimethylsiloxane and polymerization was carried out for 3.75 hours rather than 4.5 hours.

Composition Number 2 was prepared as in Example 8, except the filler was fumed silica having a surface area of about 255 m²/g Polymerization was for 2 hours.

Composition Number 3 was prepared as was Composition No. 2, except the filler was fumed silica having a surface area of about 200 m²/g.

Composition Number 4 was prepared as was Composition Number 2, except the filler was fumed silica having a surface area of about 130 m²/g and polymerization was for 3 hours.

Each composition was molded and tested as in Example 8 with the results in Table I showing that the starting polydimethylsiloxane oligomer was polymerized in the presence of the reinforcing filler and that the silicone polymer-filler mixture produced could be catalyzed, molded, and cured into a useful elastomer.

TABLE I

| Composition | Filler Surface Area m²/g | Polymerization Time, hours | Durometer Shore A | Tensile Strength MPa (megaPascal) | Elongation percent | Polymer Molecular Weight |
| --- | --- | --- | --- | --- | --- | --- |
| 1 | 400 | 3.75 | 57 | 3.58 | 125 | 135,000 |

TABLE I-continued

| Composition | Filler Surface Area m²/g | Polymerization Time, hours | Durometer Shore A | Tensile Strength MPa (megaPascal) | Elongation percent | Polymer Molecular Weight |
| --- | --- | --- | --- | --- | --- | --- |
| 2 | 255 | 2 | 40 | 4.31 | 266 | 326,000 |
| 3 | 200 | 2 | 32 | 5.97 | 410 | 332,000 |
| 4 | 130 | 3 | 31 | 5.62 | 367 | 365,000 |

EXAMPLE 10

Compositions were prepared in which the polydiorganosiloxane was a copolymer.

A first composition was prepared following the procedure of Example 8 using 100 parts of the polydimethylsiloxane of Example 8, 20 parts of the filler, 1 part of the lauryltrimethylammonium acetate and 1 part of the glacial acetic acid was added each hour of the polymerization. The polymerization was continued for 3 hours, then the catalyst was decomposed by heating for 1 hour at 150° C. under a pressure of 8 kPa.

A sample of the paste-type polymer-filler mixture was weighed, then heated for 3 hours at 200° C. in an air-circulating oven, cooled, and reweighed. The weight loss was 1.2 percent of the original weight.

A sample of the polymer-filler mixture was heated 3 hours at 200° C., cooled, then catalyzed with 1.5 parts of a 50 percent active paste of 2,4-dichlorobenzoyl peroxide per 100 parts of mixture. The catalyzed mixture was molded and tested as described in Example 8, the results being as shown in Table II.

A second composition was prepared in the same manner as the first, except the polymer was made up of 99.84 parts of the polydimethylsiloxane of Example 8 and 0.16 part of a hydroxyl-endblocked polymethylvinylsiloxane having an average of about 10 methylvinylsiloxy units per molecule. This ratio gave a copolymer having 0.14 mol percent vinyl radical after polymerization. A sample of 100 parts of the polymer-filler mixture was catalyzed with 2.5 parts of dicumyl peroxide (a vinyl-specific peroxide), then molded 10 minutes at 150° C. Test pieces were prepared and tested as in Example 8 with the results shown in Table II.

A third composition was prepared in the same manner as the second, except the polymer was made up of 98.8 parts of the polydimethylsiloxane and 1.2 parts of the polymethylvinylsiloxane. This ratio gave a copolymer having 1.03 mol percent vinyl radical by analysis after polymerization (1.0 theoretical). The polymerization time was 4 hours. This polymer-filler mixture was also analyzed for weight average molecular weight as in Example 8 with the result shown in Table II. Test pieces were prepared and tested as in Example 8 with the results shown in Table II.

All of the compositions produced useful silicone elastomers.

TABLE II

| Composition | Mol Percent Vinyl | Durometer Shore A | Tensile Strength MPa | Elongation percent | Polymer Molecular Weight |
| --- | --- | --- | --- | --- | --- |
| 1 | 0 | 25 | 3.15 | 410 | 537,000 |
| 2 | 0.14 | 31 | 3.65 | 400 | — |
| 3 | 1.0 | 42 | 3.21 | 197 | 704,000 |

That which is claimed is:

1. A method of polymerizing polydiorganosiloxane oligomer comprising
   (A) removing water from a fluid mixture of
   (i) 100 parts by weight of polydiorganosiloxane (a) of the formula $HO(R_2SiO)_xH$ where each R is selected from the group consisting of methyl, ethyl, propyl, phenyl, vinyl, allyl, and 3,3,3,-trifluoropropyl radicals, x being an average of from 3 to 50,
   (ii) from 0.05 to 5.0 parts by weight of quaternary ammonium carboxylate of the formula

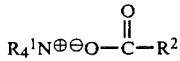

where each $R^1$ is selected from the group consisting of monovalent aliphatic radicals having from 1 to 20 carbon atoms and aralkyl radicals and each $R^2$ is selected from the group consisting of monovalent aliphatic hydrocarbon radicals of 5 or less carbon atoms, phenyl radical, and benzyl radical, at least one $R^1$ having 4 or greater carbon atoms, and
   (iii) at least 0.05 part by weight of carboxylic acid of the formula $R^2COOH$ where $R^2$ is as defined above,
   at a temperature in the range of from 90° C. to 150° C. until the predetermined increase in molecular weight of (a) is achieved by condensation polymerization, then
   (B) cooling to ambient temperature to produce a polydiorganosiloxane having a higher molecular weight than (i) of a higher viscosity.

2. The method of claim 1 in which the temperature of the mixture of step (A), after the predetermined increase in molecular weight of (a) is achieved, is increased to a temperature sufficient to cause the condensation polymerization to cease, removing volatile by-products during the process, then proceeding with step (B).

3. The method of claim 2 in which the mixture of step (A) includes a solvent which is non-reactive with the ingredients.

4. The method of claim 2 in which step (A) includes in the mixture a polydiorganosiloxane (b) of the formula $R_3^3SiO(R_2SiO)_zH$ where each R is as defined above, $R^3$ is selected from the group consisting of monovalent hydrocarbon radicals of 5 or less carbon atoms, phenyl radical, and benzyl radical, z is an average value of from 0 to 50 inclusive, the amount of polydiorganosiloxane (b) being determined by the desired average molecular weight of the polymer being produced.

5. The method of claim 4 in which the mixture of step (A) includes a solvent which is non-reactive with the ingredients and has a boiling point in the range of from 90° C. to 150° C. at the operating pressure.

6. The method of claim 2 in which the fluid mixture of step (A) includes from 2 to 70 parts by weight of reinforcing filler, said filler being acidic or neutral, to yield a fluid, non-crepeing silicone polymer-filler mixture of the desired viscosity.

7. The method of claim 2 in which (i) is heated to a temperature of from 100° C. to 135° C. to remove water before the addition of the quaternary ammonium carboxylate and the carboxylic acid.

8. The method of claim 7 in which from 2 to 70 parts by weight of reinforcing filler, said filler being acidic or neutral, is admixed with (i) before the addition of the quaternary ammonium carboxylate and the carboxylic acid to yield a fluid, non-crepeing silicon polymer-filler mixture.

9. The method of claim 8 in which the reinforcing filler is from 10 to 50 parts of fumed silica, the quaternary ammonium carboxylate is present in an amount of from 0.1 to 2 parts by weight, and the carboxylic acid is present in an amount of from 0.5 to 10 parts by weight.

10. The method of claim 9 in which the quaternary ammonium carboxylate is lauryltrimethylammonium acetate and the carboxylic acid is glacial acetic acid.

11. The method of claim 10 in which the silicone polymer-filler mixture is further mixed with curing agent suitable for use with the silicone polymer-filler mixture to yield a fluid, non-crepeing curable composition.

12. The method of claim 11 in which the curing agent an organic peroxide suitable for curing silicone elastomers.

13. The method of claim 4 in which (ii) is lauryltrimethylammonium acetate in an amount of from 0.1 to 2.0 parts by weight and (iii) is glacial acetic acid in an amount of from 0.5 to 10 parts by weight.

14. The method of claim 2 in which the carboxylic acid is glacial acetic acid and the carboxylate of the quaternary ammonium carboxylate is acetate, the temperature of (A) is from 110° C. to 130° C., and the temperature used to cause the polymerization to cease is from 150° C. to 200° C.

15. The method of claim 14 in which polydiorganosiloxane (a) contains R radicals selected from the group consisting of methyl and vinyl radicals, (ii) is lauryltrimethylammonium acetate in an amount of from 0.1 to 2.0 parts by weight, and the glacial acetic acid is present in an amount of from 0.5 to 10 parts by weight.

16. The method of claim 15 in which the mixture of step (A) includes from 10 to 50 parts by weight of fumed silica, to yield a fluid, non-crepeing silicone polymer-filler mixture.

17. The product obtained by the method of claim 1.
18. The product obtained by the method of claim 2.
19. The product obtained by the method of claim 3.
20. The product obtained by the method of claim 5.
21. The product obtained by the method of claim 6.
22. The product obtained by the method of claim 11.
23. The product obtained by the method of claim 12.
24. The product obtained by the method of claim 13.
25. The product obtained by the method of claim 16.

* * * * *

UNITED STATES PATENT AND TRADEMARK OFFICE
CERTIFICATE OF CORRECTION

PATENT NO. : 4,486,567

DATED : December 4, 1984

INVENTOR(S) : Sheryl A. Bowman, James R. Falender, Jonathon Lipowitz, and John C. Saam It is certified that error appears in the above-identified patent and that said Letters Patent is hereby corrected as shown below:

In column 4, line 43; the letter/number "Cl" should read letters "Cl".

In Column 8, line 27; the word "polymerizations" should read "polymerization".

In Column 10, line 36; the words "amino radicals, and amino radicals" should read "amino radicals, and amido radicals".

In Column 13, line 18; the word "distilation" should read "distillation".

In Column 14, line 37; the word "resiliency" should read "Resiliency".

In Column 14, line 49; the words "255 $m^2$/g Polymerization" should read "$m^2$/g. Polymerization".

In Column 17, line 7; the word "non-crepeing" should read "non-creping".

UNITED STATES PATENT AND TRADEMARK OFFICE
CERTIFICATE OF CORRECTION

PATENT NO. : 4,486,567                          Page 2 of 2

DATED      : December 4, 1984

INVENTOR(S): Sheryl A. Bowman, James R. Falender,
             Jonathon Lipowitz, and John C. Saam It is certified that error appears in the above-identified patent and that said Letters Patent is hereby corrected as shown below:

In Column 17, line 17; the word "non-crepeing" should read "non-creping".

In Column 17, line 32; the word "non-crepeing" should read "non-creping".

In Column 18, line 1; the words "agent an" should read "agent is an".

In column 18, line 22; the word "non-crepeing" should read "non-creping".

Signed and Sealed this

Eleventh Day of June 1985

[SEAL]

Attest:

DONALD J. QUIGG

Attesting Officer

Acting Commissioner of Patents and Trademarks